United States Patent Office 3,120,675
Patented Feb. 11, 1964

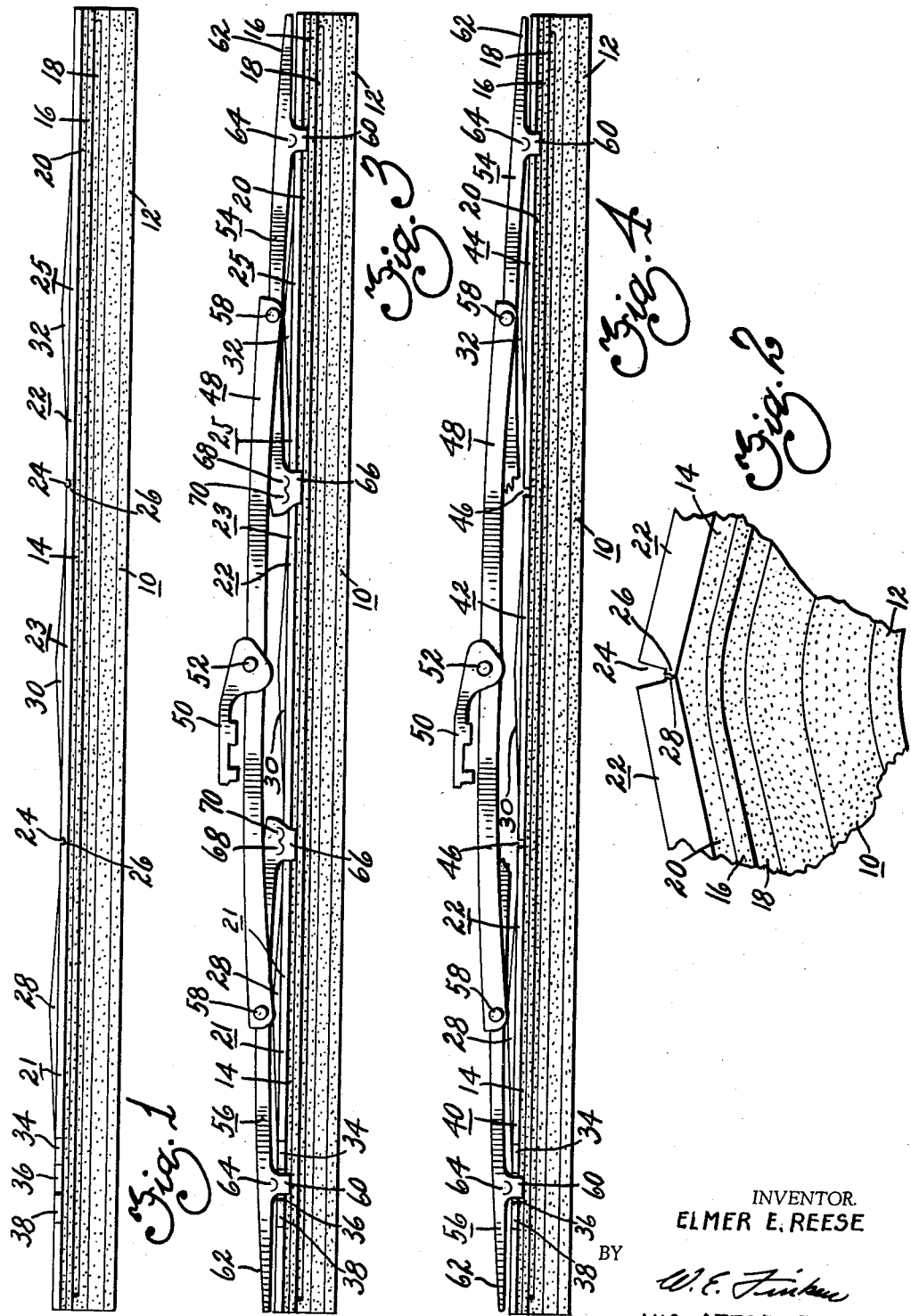

3,120,675
WIPER BLADE ASSEMBLY
Elmer E. Reese, Rochester, N.Y., assignor to General Motors Corporation, Detroit, Mich., a corporation of Delaware
Filed May 14, 1962, Ser. No. 194,407
10 Claims. (Cl. 15—250.42)

The invention pertains to wiper blades, and particularly to an improved squeegee and a pressure applying superstructure for flexible wiper blade assemblies.

A wiper blade assembly having a triple yoke pressure applying superstructure and a squeegee with a retention portion comprising a relatively hard, resiliently flexible plastic material, and wherein the retention portion is continuous and coextensive with an elastomeric wiping element is disclosed in copending application Serial No. 129,576 filed August 7, 1961, in the name of Contant et al. and assigned to the assignee of this invention. The present invention relates to an improved pressure applying superstructure and squeegee of the general type disclosed in the aforementioned copending application, but wherein the number of pressure points between the pressure applying superstructure and the squeegee is increased, and wherein the retention portion of the squeegee is interrupted at spaced intervals, the interruptions being spanned by spaced pressure points of the pressure applying superstructure when the squeegee is assembled therewith.

Accordingly, among my objects are the provision of an improved pressure applying superstructure for a wiper blade having dual sets of spaced apart pressure points on at least two free ends of the pressure applying members; the further provision of an improved three member pressure applying superstructure for applying pressure to six spaced apart points of a squeegee; and the further provision of an improved squeegee having a continuous elastomeric wiping element and a flexible retention portion comprising a plurality of spaced apart flexible sections arranged end-to-end along the back of the wiping element; and the still further provision of an improved wiper blade assembly having an interrupted retention portion with a continuous wiping element in combination with a pressure applying superstructure having claws with dual sets of spaced pressure points for spanning the interruptions between the several retention sections.

The aforementioned and other objects are accomplished in the present invention by providing spaced sets of arcuate dimples adjacent the inner ends of the pressure applying members, each dimple applying pressure to a point adjacent the end of the aligned retention sections, or backers, with the inner ends of the pressure applying members straddling the interruptions between the backers. Specifically, the pressure applying superstructure may be of any known type and thus may comprise a plurality of pivotally interconnected yokes, a plurality of stacked levers, or a combination of yokes and levers. As disclosed, the pressure applying superstructure comprises a primary yoke and a pair of secondary yokes, the inner ends of the secondary yokes having claws with spaced sets of dual arcuate dimples arranged to span the interruptions in the retention portion of the squeegee. Two embodiments of a squeegee are disclosed herein, both embodiments including an elongate elastomeric wiping element to which a tough, resilient, polymer plastic retention portion is adhesively bonded. In one embodiment the retention portion is continuous and coextensive with the wiping element and has a pair of spaced transversely extending notches extending thereacross to form three backers interconnected by thin readily breakable webs. After bonding, the retention portion of the wiping element and the webs may be broken to form an interrupted support. In the second embodiment the retention portion comprises three individual backers which are bonded to the wiping element in end-to-end relation with their ends spaced slightly apart.

Further objects and advantages of the present invention will be apparent from the following description, reference being had to the accompanying drawing, wherein preferred embodiments of the present invention are clearly shown, and wherein similar numerals depict similar parts throughout the several views.

FIGURE 1 is a side view, in elevation, of a squeegee constructed according to one embodiment of the present invention.

FIGURE 2 is an enlarged fragmentary view, in elevation, of the squeegee of FIGURE 1 showing the manner in which the thin webs interconnecting the backers are broken.

FIGURE 3 is a side view, in elevation, of the improved wiper blade assembly embodying the squeegee of FIGURE 1.

FIGURE 4 is a side view, in elevation, with certain parts broken away, of a wiper blade assembly including a squeegee constructed according to the second embodiment of this invention.

With reference to FIGURE 1, the preferred squeegee construction comprises an elongate elastomeric body 10 of rubber, constituting the wiping element, having a freely flexible wiping lip 12 along one edge and an upstanding rib 14 along the opposite edge. The body 10 is formed with coextensive outwardly projecting flanges 16, and a pair of flexure grooves 18 disposed therebeneath and terminating short of the ends of the wiping element. A plastic retention portion 22, to be described in detail hereinafter, is adhesively bonded to the upstanding rib 14, the retention portion 22 defining a pair of coplanar grooves 20 with the flanges 16.

The retention portion 22 is preferably composed of polymer plastic known in the trade as "Delrin" as disclosed in the aforementioned copending application Serial No. 129,576 and has a greater width than thickness, so that while it is readily flexible in a plane normal to the surface to be wiped, it is substantially rigid in a plane parallel thereto. The retention portion is divided into three sections 21, 23 and 25 by a pair of transversely extending notches 24. The notches do not extend entirely through the retention portion 22, and thus the three sections, or backers, are interconnected by thin webs 26. Moreover, in order to assure substantially uniform distribution of applied wiper arm pressure, each section of the retention portion is of nonuniform thickness, and thus nonuniformly flexible, this being accomplished by providing upstanding ribs 28 and 30 and 32 on the three sections 21, 23 and 25, respectively, between the marginal edges thereof. The ribs 28, 30 and 32 are of varying thickness and taper substantially uniformly from the center towards both ends whereby pressure is applied to each backer section at points of minimum thickness, the points of maximum thickness being located midway between the pressure applying points. By constructing each backer section of the retention portion 22 in this manner, pressure will be distributed substantially uniformly to the wiping lip 12 on the squeegee between each span of the pressure applying superstructure.

The heel end backer section 21 is preferably formed with an elongate slot between the marginal edges thereof, not shown, the outer marginal edges of this backer section being outwardly tapered at 34 and 36 in opposite directions and notched at 38 therebetween. This construction forms a releasable interlock for retaining the pressure applying superstructure assembly with the squeegee in accordance with the teachings of copending application Serial No. 82,810 filed January 16, 1961, in the name of Latone and assigned to the assignee of this invention.

Referring to FIGURE 2, after the retention portion 22 has been adhesively bonded to the upstanding rib 14 of the wiping element 10, the wiping element can be excessively flexed in the area of the notches 24 so as to fracture the relatively thin webs 26 at 28. The fractures at 28 thus separate the retention portion into the three backers 21, 23 and 25 which are arranged end-to-end, the backer sections being connected to a continuous elastomeric wiping element. By forming the three backer sections as an integral retention portion 22 prior to bonding the same to the wiping element 10, proper spacing of the three backer sections along the lip 14 of the wiping element can be readily achieved. Alternatively, and as shown in FIGURE 4, three separate plastic backers 40, 42 and 44, identical in construction to the three figures of the embodiment shown in FIGURE 1, may be bonded to the upstanding rib 14, the backers 40, 42 and 44 being spaced apart at 46.

Referring to FIGURES 3 and 4, the improved pressure applying superstructure comprises a channel-shaped primary yoke 48 having a bayonet-type arm connector 50 pivotally connected thereto by a transversely extending pin 52 at substantially the center thereof, and a pair of channel-shaped secondary yokes 54 and 56 pivotally connected thereto by transversely extending pins 58. The secondary yokes 54 and 56 are thus movable relative to the primary yoke 48 and are constructed to nest within the end portions of the channel-shaped primary yoke 48 during flexure of the squeegee to conform to a convexly curved surface. The tip end of the secondary yoke 54 has an outer claw 60 for straddling the retention portion 22 and an integral shield extension 62. The claw 60 has inwardly extending flanges, not shown, which are disposed in the groove 20, and each side wall is formed with an arcuate dimple, or tang, 64 adapted to engage the upper surface of the retention portion 22 along a marginal edge thereof and constituting a pressure point.

The inner end of the tip secondary yoke 54 is formed with an elongate claw 66 for straddling the retention portion 22, and a pair of spaced dimples, or tangs, 68 and 70 for engaging the retention portion 22. The dimples 68 and 70 are spaced apart a distance greater than the width of the notch 24 so that the dimple 68 applies pressure adjacent the end of the outer backer section 25 and the dimple 70 applies pressure to the outer end of the intermediate backer section 23, with the notch 24 being spanned by the claw 66. The elongate claw 66 substantially precludes relative lateral movement between the two backer sections so as to maintain the squeegee substantially rigid in a plane parallel to the surface to be wiped.

The outer end of the heel secondary yoke is formed with a similar claw 60 adapted to interlock with the notch 36 in the retention portion so as to maintain the superstructure assembled with the squeegee. The claw 60 is likewise formed with a dimple 64, and the heel yoke has an integral shield extension 62. Similarly, the inner end of the heel secondary yoke 56 is formed with an elongate claw 66 and spaced arcuate dimples 68 and 70 located on opposite sides of the notch 24, the notch being spanned by the claw. When the identical superstructure is connected with the squeegee shown in FIGURE 4, the dimple 68 of the tip yoke 54 engages the end of backer 44, while the dimple 70 engages the outer end of backer 42. Likewise the dimple 68 on the yoke 56 engages the backer 40 while the dimple 70 of the heel yoke engages the backer 42.

In both embodiments of the present invention pressure is applied at six longitudinally spaced points along the length of the squeegee, namely at points adjacent the ends of the medial backer, at the inner ends of the tip and heel backers, and at points spaced from the outer ends of the tip and heel backers. Thus, each backer has pressure applied at two spaced apart points for conforming it to a curved surface, while the three backers are interconnected by a continuous wiping element. Lateral movement is restricted between the backers by the elongate claws on the secondary yokes which straddle the interruptions between the backers.

While the embodiments of the invention as herein disclosed constitutes preferred forms, it is to be understood that other forms might be adopted.

What is claimed is as follows:

1. A squeegee comprising, an elongate freely flexible body of elastomeric material having a wiping lip along one edge, a resiliently flexible plastic retention portion secured to the opposite edge of said elastomeric body, said retention portion comprising a plurality of spaced apart sections arranged end-to-end.

2. A squeegee comprising, an elongate freely flexible body of elastomeric material having a wiping lip along one edge, and a resilient flexible plastic retention portion secured to the opposite edge of said elastomeric body, said retention portion comprising a plurality of spaced apart sections arranged end-to-end, said spaced sections being interconnected by readily breakable thin webs.

3. A squeegee comprising, an elongate freely flexible body of elastomeric material having a wiping lip along one edge, and an interrupted plastic retention portion secured to the opposite edge of said elastomeric body having a plurality of sections arranged in end-to-end relation, each section being nonuniformly flexible in a plane normal to the surface to be wiped and substantially inflexible in a plane parallel to such surface.

4. A squeegee comprising, an elongate freely flexible body of elastomeric material having a wiping lip along one edge, and an interrupted plastic retention portion secured to the opposite edge of said elastomeric body comprising a plurality of sections arranged in end-to-end relation and interconnected by readily breakable thin webs, each section being nonuniformly flexible in a plane normal to the surface to be wiped and substantially inflexible in a plane parallel to such surface.

5. A wiper blade assembly including, an elongate squeegee comprising a freely flexible elastomeric body having a wiping lip along one edge and an interrupted retention portion secured to the opposite edge, said interrupted retention portion comprising a plurality of flexible sections arranged in end-to-end relation, and a pressure applying superstructure comprising a plurality of relatively movable members having free ends, the free ends of some of said members being longitudinally elongate and arranged to span the interruptions between said retention sections, said pressure applying superstructure applying pressure at two longitudinally spaced points on each retention section.

6. A wiper blade assembly including, an elongate squeegee comprising a freely flexible elastomeric body having a wiping lip along one edge and a flexible retention portion secured to the opposite edge, said retention portion comprising a plurality of spaced apart sections arranged end-to-end, and a pressure applying superstructure comprising a plurality of relatively movable members having free ends for applying pressure to each retention section at two spaced apart points, with at least some of the free ends of the superstructure members spanning the space between said retention sections.

7. A wiper blade assembly including, an elongate squeegee comprising a freely flexible elastomeric body having a wiping lip along one edge and a flexible retention portion secured to the opposite edge, said retention portion comprising a plurality of spaced apart flexible backer sections, and a pressure applying superstructure comprising a plurality of relatively movable members having claws at their free ends straddling the marginal edges of said backer sections, all of said claws having at least one set of pressure applying points, and some of said claws being elongate and having spaced apart dual sets of pressure applying points, said superstructure applying pressure to each backer section at two longitudinally spaced apart points, with said elongate claws spanning the interruptions between said backer sections.

8. A wiper blade assembly including, an elongate elastomeric squeegee comprising a flexible body having a wiping lip along one edge and three flexible backer sections spaced apart and arranged in end-to-end relation along the opposite edge of said elastomeric body, and a pressure applying superstructure comprising a plurality of pivotally interconnected members having claws at their free ends straddling the marginal edges of said backer sections, at least two of said claws being longitudinally elongate and spanning the interruptions between said backer sections, said elongate claws having longitudinally spaced apart dual sets of pressure applying points for applying pressure to opposite ends of the medial backer section and the inner ends of the end backer sections, the other claws having pressure applying points remote from the inner ends of the end backer sections.

9. A wiper blade assembly including, an elastomeric squeegee comprising an elongate flexible elastomeric body having a wiping lip along one edge and three flexible backer sections spaced apart and arranged in end-to-end relation along the opposite edge of said elastomeric body, and a pressure applying superstructure comprising a plurality of pivotally interconnected channel-shaped members having claws at their free ends, at least two of said claws being longitudinally elongate and spanning the interruptions between said three backer sections, each claw comprising inwardly flanged edges for straddling the marginal edges of said backer sections and having at least one set of aligned inwardly extending arcuate dimples in the side walls thereof for applying pressure to the marginal edges of said backer sections, each elongate claw having longitudinally spaced apart dual sets of dimples for applying pressure to adjacent ends of the spaced apart backer sections.

10. A wiper blade assembly including, an elastomeric squeegee comprising an elongate flexible elastomeric body having a wiping lip along one edge and three flexible backer sections spaced apart and arranged in end-to-end relation along the opposite edge of said elastomeric body, and a pressure applying superstructure comprising a primarly yoke and a pair of secondary yokes pivotally connected to the ends of the primary yokes, said secondary yokes having claws at their free ends, the claws at the inner ends of said secondary yokes being longitudinally elongate and spanning the interruptions between said backer sections, each claw at the outer end of each secondary yoke having a set of pressure applying points, and each elongate claw at the inner end of each secondary yoke having spaced dual sets of pressure applying points whereby the medial backer section has pressure appplied thereto adjacent each end thereof by the inner ends of said secondary yokes, and each end backer section has pressure applied to the longitudinally spaced apart points thereof by its respective secondary yoke.

References Cited in the file of this patent

FOREIGN PATENTS 1,077,089    Germany  -------------- Mar. 5, 1960